Patented May 20, 1930

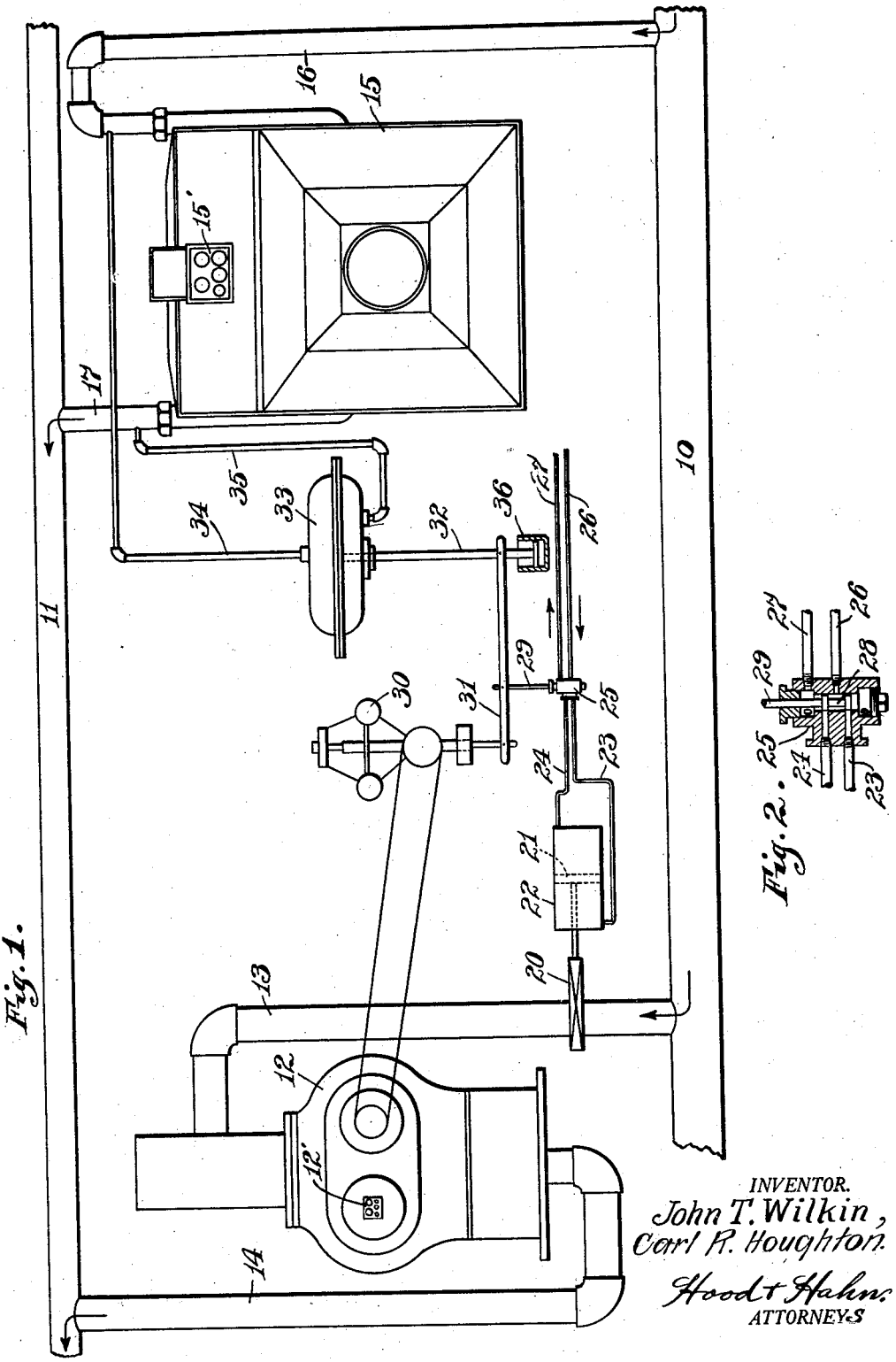

1,759,384

UNITED STATES PATENT OFFICE

JOHN T. WILKIN AND CARL R. HOUGHTON, OF CONNERSVILLE, INDIANA, ASSIGNORS TO THE CONNERSVILLE BLOWER COMPANY, INC., OF CONNERSVILLE, INDIANA, A CORPORATION OF INDIANA

GAS-METERING SYSTEM

Application filed June 13, 1925. Serial No. 36,819.

There are many instances in gas delivery systems where the demand is a largely fluctuating one, as, for instance, in manufacturing plants operating only a limited number of hours each day, where the demand is heavy during the working period and very light during the non-working period.

In metering the gas flow in such a system it is quite desirable that the meter capacity be of such character that accurate results may be attained under different loads and where the large volume meter is of the rotary lobed impeller type, as shown in Patent No. 1,528,728, there is a possibility that the low load demand may be so small as to be only equal to or less than the leakage through the meter and under such conditions the producer must either make an arbitrary leakage charge or lose that volume of his product.

The object of our present invention is to produce a metering system which will accurately measure delivered gas both when the demand is small and when the demand is great.

The accompanying drawings illustrate our invention. Fig. 1 is a diagrammatic illustration of our system, no attempt having been made to show the parts in proper proportion, and Fig. 2 is a sectional view of a convenient form of valve for controlling the flow of motive fluid to the motor for actuating the valve in the supply line of the large volume meter.

In the drawings 10 indicates a supply main and 11 a delivery main between which our metering system is installed.

A large-volume meter 12, conveniently but not necessarily of a rotary lobed impeller type, referred to above, receives gas from a supply line 13 leading from main 10 and delivers gas through a line 14 leading into main 11. A small volume meter 15, conveniently of the common and well known tin meter type, receives gas from a pipe 16 leading from main 10 and delivers gas through a pipe 17 into main 11.

Each of the meters is provided with suitable integrators or metering elements 12' and 15' respectively, and the operation of each meter is dependent upon the differential of pressure between the pressure in the supply main and the pressure in the delivery main. The supply line 13 of meter 12 is provided with a valve 20 closed and opened by any suitable automatic means. In the present instance valve 20 is controlled by piston 21 in a cylinder 22, the opposite ends of which are provided with pressure supply lines 23 and 24 respectively, leading from a valve casing 25 having a pressure supply line 26 and an exhaust line 27, and within which is mounted a valve 28 having stem 29.

Arranged to be rotated by a moving element of meter 12 is a speed-controlled governor 30, the stem of which is connected to a lever 31 connected to stem 29. Also connected to lever 31 is the stem 32 of a pressure controlled device under the influence and control of the differential of meter 15. In the present instance said device comprises a diaphragm regulator 33, the diaphragm of which is connected to stem 32, one side of the chamber being connected by pipe 34 with the supply line of meter 15 and the other side of the chamber being connected by pipe 35 with the delivery line of meter 15. A dash pot 36 may be connected to stem 32 so as to damp the movements of said stem.

In operation the parts are so adjusted and proportioned that meter 15 has a sufficient capacity to supply the low duty demands of the system, valve 20 at that time being closed and valve 28 being cracked enough to maintain pressure through pipe 24 and relieve pressure through pipe 23, the position of stem 32 at that time, under the normal differential of regulator 33, holding valve 28 in the described position, governor 30 being stationary.

Whenever the duty demand of the system exceeds the capacity of meter 15 the differential of regulator 33 will increase and will cause stem 32 to descend, whereupon valve 28 is shifted to admit pressure through pipe 23 and relieve pressure through pipe 24, whereupon valve 20 is opened and meter 12 begins to operate. Promptly following the start of meter 12 governor 30 operates upon lever 31 to shift valve 28 to further open communication between pipes 26 and 23 thus insuring maintenance of open position of valve 20, because, as soon as the increased demand is being supplied by meter 12, the differential in regulator 33 will be reduced to normal, and the return movement of stem 32 would otherwise move valve 28 to reverse position. Whenever the load demand decreases sufficiently the speed of governor 30 will be decreased to a point where it will move lever 31 back to initial position, thus permitting valve 20 to be closed.

The total consumption for any given period will, of course, be determined by adding the readings of the integrators 12′ and 15′.

It will be readily understood that any desired means for automatically opening and closing valve 20, under the joint control of the two meters may be used without departing from the spirit of our invention.

We claim as our invention:

1. A metering system comprising a supply main, a delivery main, a large volume meter and a small volume meter in parallel between said mains, a valve controlling flow through the large volume meter, means for automatically opening or closing said valve as delivery demand respectively exceeds or drops to a predetermined volume, said means being under the influence of each of said meters and under the joint influence of both.

2. A metering system comprising a supply main, a delivery main, a large-volume meter and a small-volume meter in parallel between said mains, a valve controlling flow through the large-volume meter, means for automatically opening and closing said valve, and a controlling element for said means, means under the influence of the pressure differential of the small-volume meter for affecting said controlling element, and means affected by the registering movement of the large-volume meter for affecting said controlling element.

3. A metering system comprising a supply main, a delivery main, a large volume meter of the rotary element type arranged between the supply main and delivery main, a small-volume meter arranged between the supply main and delivery main, a valve controlling flow through the large volume meter, a pressure-differential regulator subject to the pressure-differential of the small-volume meter, a speed control governor under the influence of the large volume meter, a motor for opening and closing the valve, and a controlling means for said motor including a member under the joint influence of the regulator and governor.

In witness whereof, we have hereunto set our hands at Connersville, Indiana, this 5th day of June, A. D. one thousand nine hundred and twenty five.

JOHN T. WILKIN.
CARL R. HOUGHTON.